US007330228B2

United States Patent
Kiguchi et al.

(10) Patent No.: US 7,330,228 B2
(45) Date of Patent: Feb. 12, 2008

(54) ELECTRO-OPTICAL APPARATUS, ITS PRODUCTION METHOD, DEVICES AND ELECTRONIC APPLIANCES

(75) Inventors: Hiroshi Kiguchi, Suwa (JP); Satoru Katagami, Hara-mura (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 11/431,078

(22) Filed: May 10, 2006

(65) Prior Publication Data
US 2006/0203153 A1 Sep. 14, 2006

Related U.S. Application Data

(62) Division of application No. 10/396,335, filed on Mar. 26, 2003, now Pat. No. 7,106,399.

(30) Foreign Application Priority Data
Mar. 27, 2002 (JP) .............................. 2002-89811

(51) Int. Cl.
*G02F 1/1333* (2006.01)

(52) U.S. Cl. ..................... 349/106; 349/111

(58) Field of Classification Search ............... 349/110, 349/111, 106
See application file for complete search history.

(56) References Cited

U.S. PATENT DOCUMENTS

| 5,278,009 A | 1/1994 | Iida et al. |
| 5,716,740 A | 2/1998 | Shiba et al. |
| RE36,711 E | 5/2000 | Yaniv |
| 6,277,529 B1 | 8/2001 | Marumoto et al. |
| 6,312,771 B1 | 11/2001 | Kashiwazaki et al. |

FOREIGN PATENT DOCUMENTS

| JP | A 6-118217 | 4/1994 |
| JP | A 6-130218 | 5/1994 |
| JP | A 8-75916 | 3/1996 |

*Primary Examiner*—David Nelms
*Assistant Examiner*—Richard H Kim
(74) *Attorney, Agent, or Firm*—Oliff & Berridge, PLC

(57) ABSTRACT

The invention mitigates a drop of a protective layer and reduces disconnection of an electrode. A shading layer, a partition layer to partition a color filter layer, formed on the shading layer, and a protective layer to seal the shading layer, the partition layer and the color filter layer, are arranged on a substrate. At least a part of the partition layer covers the shading layer and separates the protective layer from the shading layer under a non-contact state.

3 Claims, 5 Drawing Sheets

(a)

(b)

(c)

(d)

(e)

(f)

(a)

(b)

(c)

ELECTRO-OPTICAL APPARATUS, ITS PRODUCTION METHOD, DEVICES AND ELECTRONIC APPLIANCES

This is a Divisional of U.S. patent application Ser. No. 10/396,335 filed Mar. 26, 2003 now U.S. Pat. No. 7,106,399, which is hereby incorporated by reference in its entirety. This application claims priority to Japanese Patent Application No. 2002-89811 filed Mar. 27, 2002, which is hereby incorporated by reference in its entirety.

BACKGROUND OF THE INVENTION

1. Field of Invention

This invention relates to an electro-optical apparatus, such as a color filter, an electroluminescence device matrix, its production method, devices and electronic appliances.

2. Description of Related Art

The related art includes an electro-optical apparatus equipped with a color filter, etc., that uses the application of an ink jet method. FIG. 6 shows an example of a color filter substrate. In the color filter substrate 1 shown in FIG. 6, a shading layer 3 formed of Cr, or the like, and referred to as "black matrix", and a bank 4 operating as a partition of ink, are implanted on a transparent substrate 2. Color filter layers 5 of red (R), green (G) and blue (B) are arranged in a predetermined pattern between the shading layer 3 and the bank 4, and a color filter is thus constituted.

A protective layer (overcoat layer) 6 formed of an acrylic resin is arranged on a surface of the color filter to protect the color filter and to planarize a surface of the color filter substrate 1. An electrode 7, such as ITO, is formed on a surface of the protective layer 6.

SUMMARY OF THE INVENTION

However, the related art technology described above is subject to the following problem.

The protective layer 6 keeps contact with both shading layer 3 and bank 4 at end portions of the color filter. Because wettability of the shading layer 3 to the protective layer 6 is different from that of the bank 4, a change of thickness of the protective layer 6 becomes sharp. More specifically, because the shading layer 3 has higher wettability to the protective layer 6 than the bank 4, the protective layer 6 is partially pulled at a portion A at which the shading layer 3 and the protective layer 6 come into contact with each other, and a drop becomes sharp on a surface B in the proximity of the contact portion. As a result, an electrode 7 extending on the surface of the protective layer is likely to undergo disconnection in the proximity of the portion B and the resulting product becomes defective.

In view of the problem described above and/or other problems, the invention provides an electro-optical apparatus capable of mitigating a drop of a protective layer and reducing disconnection of an electrode, its production method, devices and electronic appliances.

To address or accomplish the above, the invention employs the following construction.

An electro-optical apparatus according to the invention includes, on a substrate, a shading layer, a partition layer to partition a color filter layer, formed on the shading layer, and a protective layer to seal the shading layer, the partition layer and the color filter layer. At least a part of the partition layer covers the shading layer and separates the protective layer from the shading layer under a non-contact state.

Therefore, even when wettability to the protective layer is different between the shading layer and the partition layer, the shading layer does not come into contact with the protective layer, and instead the partition layer comes into contact with the protective layer. In consequence, a sharp change of the protective layer resulting from the difference of wettability can be reduced or suppressed. Since deformation of the electrode on the protective layer can be eventually mitigated, the occurrence of disconnection can be reduced.

The invention can also employ a construction in which a plurality of shading layers and a plurality of partition layers are arranged with predetermined gaps, and the partition layers covering the shading layers are positioned at the arranged end portions.

Consequently, the sharp change resulting from the difference of wettability can be reduced or suppressed in the invention, even when the thickness of the protective layer changes at the boundary between the portion at which the shading layer, the partition layer and the color filter are arranged and the portion at which they are not.

The invention can employ a construction in which the shading layer is formed of a metal material, and the partition layer and the protective layer are formed of a synthetic resin material.

According to the invention, therefore, the sharp change of the protective layer resulting from the difference of wettability can be reduced or suppressed, even when the shading layer is formed of a metal material, such as Cr, the partition layer is formed of a polymer, resin and the protective layer is formed of a synthetic resin material, such as an acrylic resin, for example.

A device according to the invention includes a shading layer, a partition layer formed on the shading layer, a functional layer formed between the partition layer and a protective layer to cover the shading layer, the partition layer and the functional layer. At least a part of the partition layer covers the shading layer and separates the protective layer from the shading layer under a non-contact state.

Consequently, the invention can reduce the occurrence of disconnection in the device and can enhance its quality. An organic EL light emitting layer and a micro-lens array can be applied to the functional layer.

An electronic apparatus according to the invention is equipped with the electro-optical apparatus described above.

Therefore, the invention can reduce the occurrence of disconnection and can enhance quality of the electronic appliance.

On the other hand, the invention provides a production method of an electro-optical apparatus that includes, on a substrate, a shading layer, a partition layer to partition a color filter layer, formed on the shading layer, and a protective layer to seal the shading layer, the partition layer and the color filter layer. The method includes: covering the shading layer with at least a part of the partition layer, and separating the protective layer from the shading layer under a non-contact state.

Therefore, even when wettability to the protective layer is different between the shading layer and the partition layer in the invention, the shading layer does not come into contact with the protective layer, and instead the partition layer comes into contact with the protective layer. For this reason, the sharp change of the protective layer resulting from the difference of wettability can be suppressed with the result that deformation of the electrode on the protective layer can be mitigated and the occurrence of disconnection can be reduced.

BRIEF DESCRIPTION OF THE DRAWINGS

FIG. 5(a) shows a cellular telephone unit, FIG. 5(b) shows a wrist timepiece type electronic appliance, and FIG. 5(c) shows a portable information processing apparatus;

DETAILED DESCRIPTION OF PREFERRED EMBODIMENTS

Figure 6:
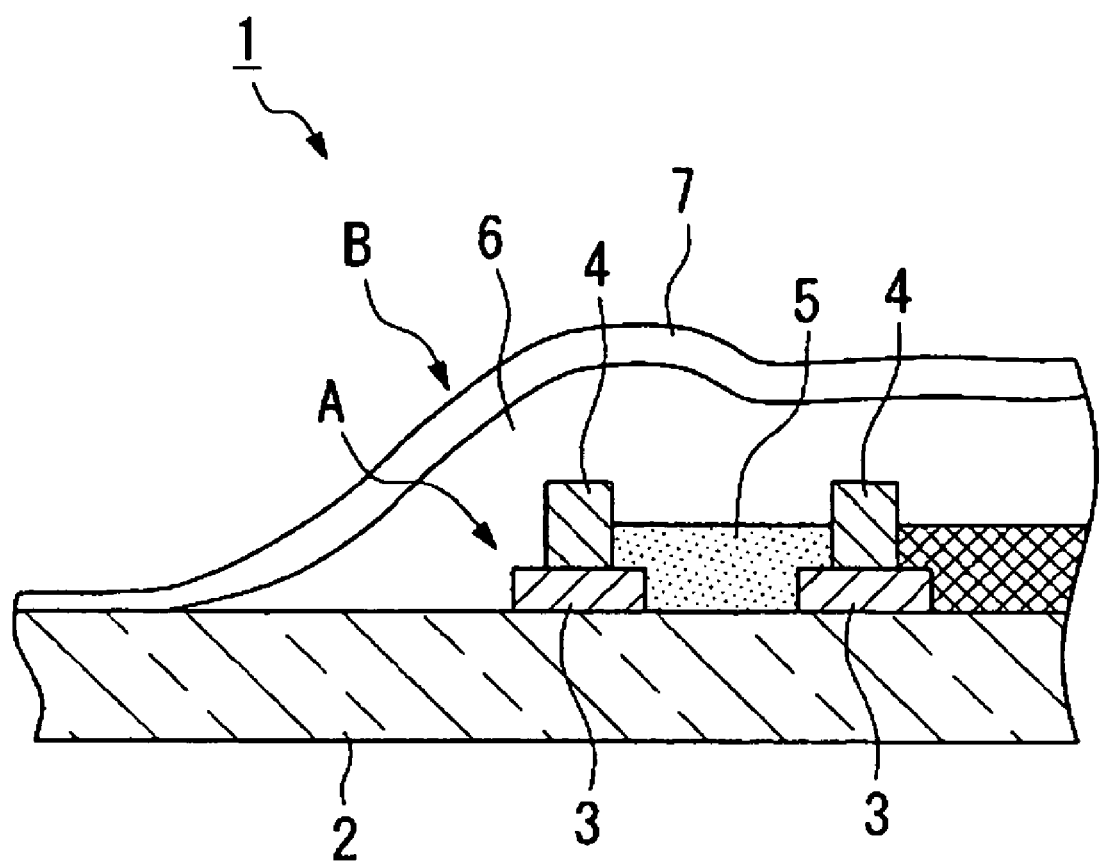
FIG. 6 is a partial sectional view showing an example of a color filter substrate according to the related art technology.

An electro-optical apparatus and its production method, devices and electronic appliances according to the invention are hereinafter explained with reference to FIGS. 1 to 5(c). Explanation is provided of production of a color filter as a component of an electro-optical apparatus by way of example. In these drawings, the same references are used to identify the same constituent elements shown in FIG. 6 as an example of the related art and explanation of such constituent elements is omitted.

Figure 1:
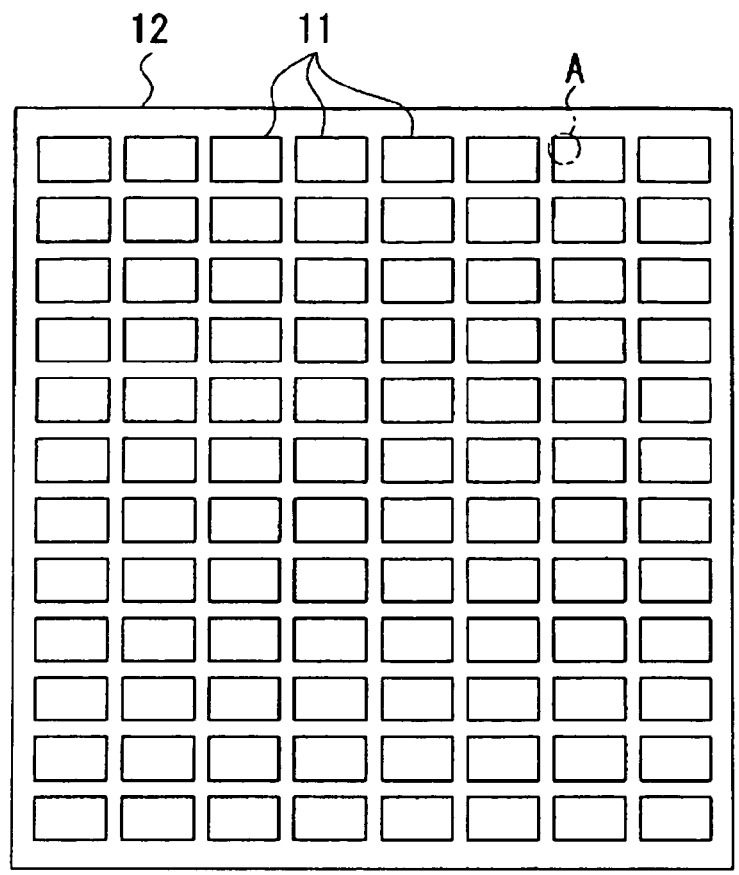
FIG. 1 is a plan view of a color filter substrate used to produce a color filter.
Figure 2:
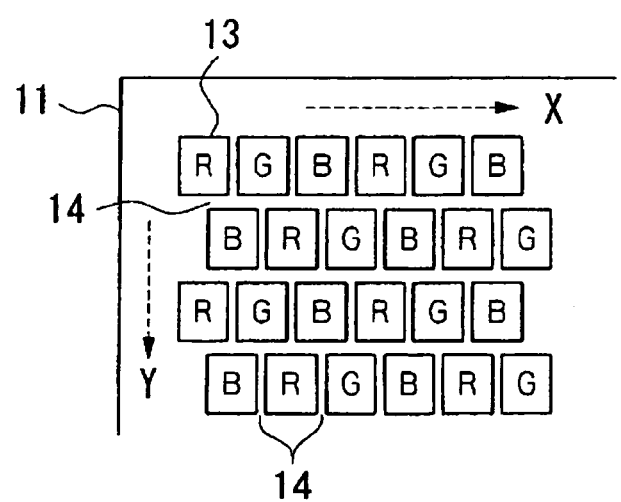
FIG. 2 is an enlarged view of a portion A in FIG. 1.

FIG. 1 is a plan view showing a planar shape of a color filter substrate used to produce the color filter in this exemplary embodiment. FIG. 2 is an enlarged view of a portion sign A in FIG. 1.

In the color filter substrate 12 shown in FIG. 1, a plurality of panel chips 11 that constitute one color filter is aligned on a plane. In this exemplary embodiment, one color filter substrate 12 includes about 100 panel chips 11. During the production of the color filter, ink jet and drying are collectively carried out for these panel chips 11, and the substrate 12 is subsequently sliced in a panel chip unit to provide the color filter.

As shown in FIG. 2, the panel chip 11 includes a plurality of pixel portions (color filter layers) 13 arranged in a matrix. A bank (partition layer) 14 partitions a boundary between one pixel portion and another. When the color filter is produced, several droplets of any one of red, green and blue ink (color material) are jetted to each pixel portion 13 to form a color filter layer. In the example shown in FIG. 2, the arrangement of red, green and blue is of a so-called "mosaic" type, however other arrangements, such as a stripe type, may also be employed so long as these three colors are uniformly arranged.

Figure 3:
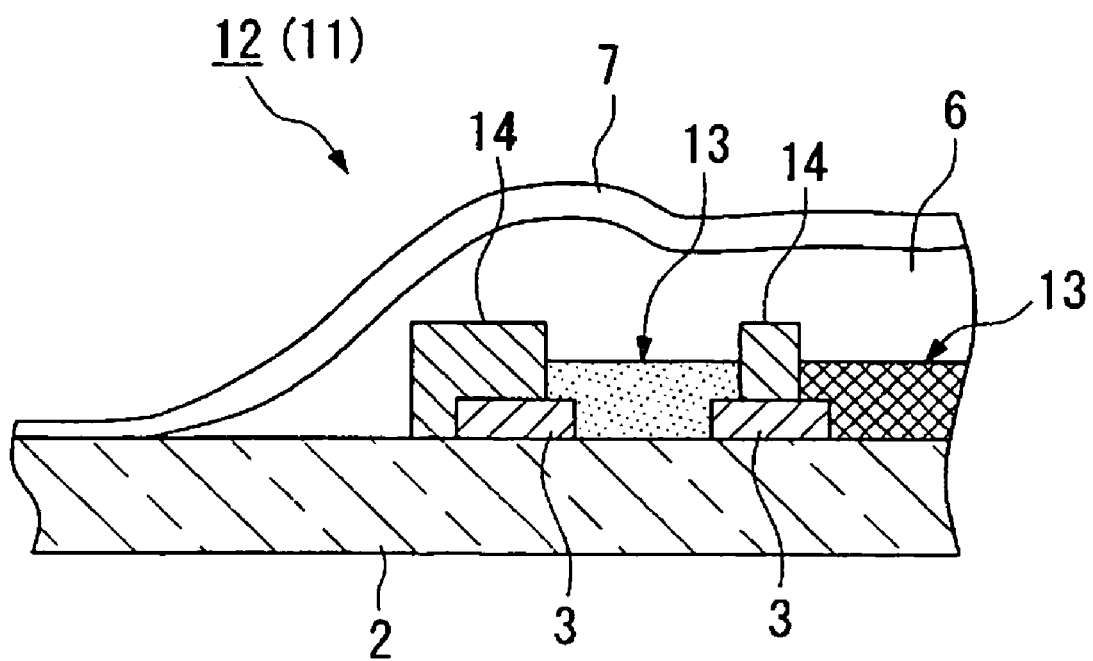
FIG. 3 is a partial sectional view of a panel end portion shown in FIG. 2.
Figure 4:
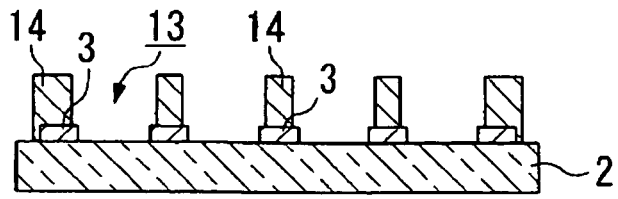
FIG. 4(a) to FIG. 4(f) are sectional views of an example of production steps of a color filter by use of a substrate.
Figure 4:
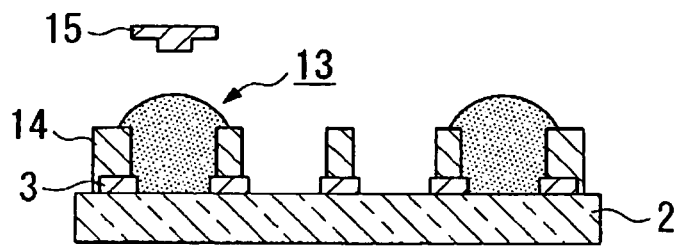
Figure 4:
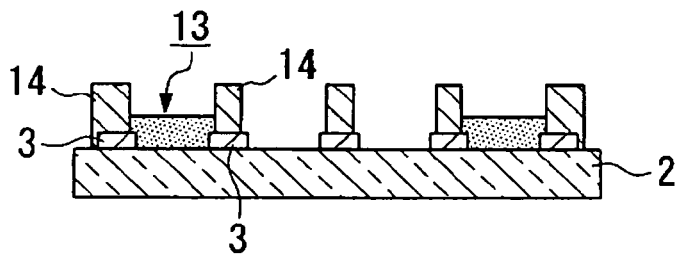
Figure 4:
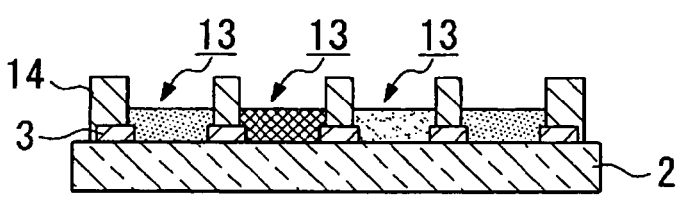
Figure 4:
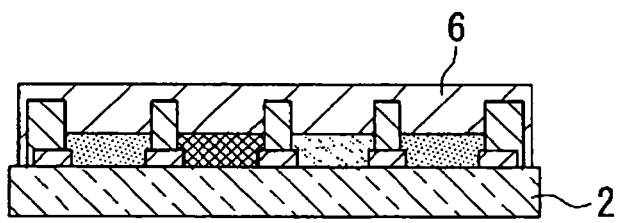
Figure 4:
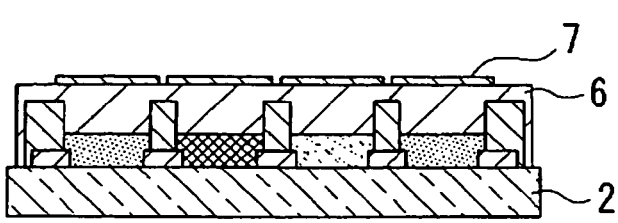
Figure 5:
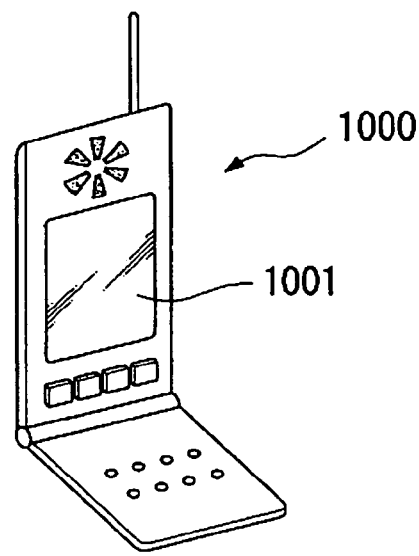
FIGS. 5(a)-5(c) are perspective views showing examples of electronic appliances equipped with an electro-optical apparatus, where
Figure 5:
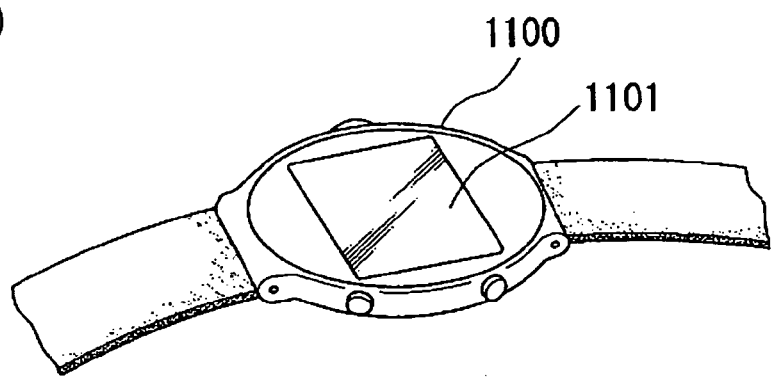
Figure 5:
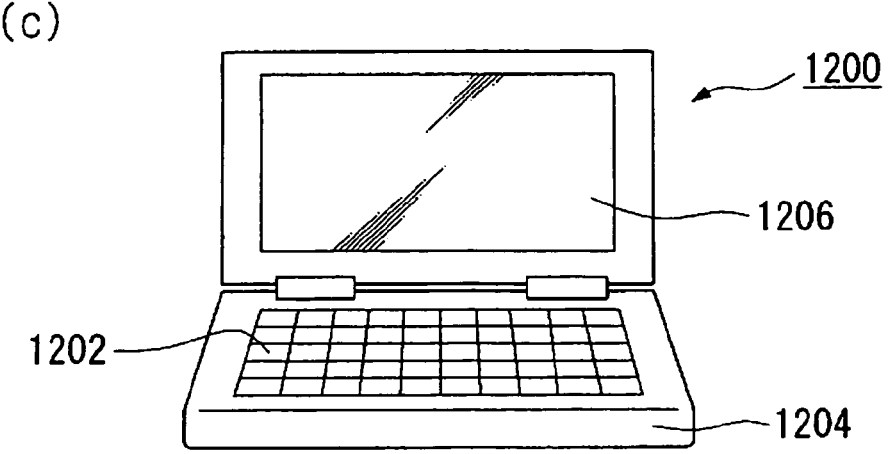

FIG. 3 is a partial enlarged view of a panel end portion shown in FIG. 2.

The panel chip 11 constituting the color filter substrate 12 includes the shading layer 3 formed of a metal material, such as Cr, and referred to as "black matrix", on a transparent substrate 2, and the bank 14 partitioning (the region of) the pixel portion 13 and formed of a synthetic resin material, such as a fluorocarbon polymer resin on the shading layer 3. As a sectional shape, the pixel portions 13 are formed as the color filters into a predetermined pattern between a plurality of shading layers 13 and a plurality of banks 14 that are respectively arranged with predetermined gaps.

The protective layer 6 formed of a synthetic resin, such as an acrylic resin, seals and protects airtight the color filter including the shading layer 3, the bank 14 and the pixel portion 13 outside the color filter, and its surface is planarized. The ITO electrode (electrode) 7 is formed on the surface (upper surface) of this protective layer 6.

The banks 14 positioned at the end portions (in both X and Y directions) among a plurality of banks 14 extend outside the panel 111 and cover the shading layer 3 in such a fashion as to separate under a non-contact state the protective layer 6 from the shading layer 3.

Next, production steps of a color filter in a production method according to the invention are explained in detail with reference to FIG. 4(a)-4(f).

Surfaces of the transparent substrate 2 formed of a non-alkali glass that is 0.7 mm thick, 470 mm long and 370 mm broad, for example, are washed with a washing solution prepared by adding 1 wt % of an aqueous hydrogen peroxide solution to hot concentrated sulfuric acid. After the transparent substrate 2 is rinsed with pure water, drying with air is conducted to obtain clean surfaces. A chromium film having a mean thickness of 0.2 μm is formed on the surface through sputtering to obtain a metal layer. Photo-resist is spin-coated to the surface of this metal layer. The substrate is then dried on a hot plate at 80° C. for 5 minutes to form a photo-resist layer.

A mask film depicting a predetermined matrix pattern shape is brought into adhesion with this substrate surface and is exposed to ultraviolet rays. Next, the substrate is immersed in an alkaline developing solution containing 8 wt % of potassium hydroxide to remove the photo-resist of the non-exposed portions, and the resist layer is thus patterned. Subsequently, the exposed metal layer is etched away with an etching solution containing hydrochloric acid as its main component. The shading layer (black matrix) 3 having a predetermined matrix pattern is thus obtained.

A negative type photosensitive resin composition of a transparent acrylic type is further spin-coated to this substrate 2. After being baked at 100° C. for 20 minutes, the substrate 2 is subjected to UV exposure with a mask film depicting a predetermined matrix pattern shape. The resin at the non-exposed portions is similarly developed by use of an alkaline developing solution. After being rinsed with pure water, the substrate 2 is spin-dried. After-baking as a final drying step is conducted at 200° C. for 30 minutes to sufficiently cure the resin portion and to form the banks 14 (refer to FIG. 4(a)). At this time, the banks 14 positioned at the end portions are so formed as to extend outward and to cover the outside of the shading layer 3 as described above.

To enhance ink wettability of the color filter layer formation regions (pixel portions) partitioned (defined) by the shading layer 3 and by the banks 14 so formed, dry etching, that is, an atmospheric pressure plasma treatment, is conducted. A high voltage is applied to a mixed gas of helium and 20% oxygen. The plasma atmosphere is created into an etching spot at the atmospheric pressure, and the substrate is passed below this etching spot to perform etching. An activation treatment of the color filter layer formation region (exposed surface of the glass substrate) is thus made with the banks 14.

Ink as a coloring material is jetted and applied to the color filter layer formation regions (pixel portions 13) from an ink jet head 15 while being controlled highly precisely (see FIG. 4(b)). The ink jet printing head 15 uses a precision head applying a piezoelectric effect, and selectively jets 8 droplets of very small ink droplets (about 10 pl/droplet), for example, to each color formation region (pixel portion 13). To control the projection speed of the droplets to the color filter layer formation region as the target from the head and to reduce or prevent the curve of projection and the occurrence of stray droplets called "satellites", not only the properties of the ink but also a voltage to drive a piezoelectric device of the head and its waveform are of importance. Therefore, the waveforms that are in advance subjected to condition setting are programmed and the ink droplets are applied in the three colors of red, green and blue to form a color filter layer having a predetermined color scheme pattern.

An example of the ink composition used contains 20 wt % of a thermosetting acrylic resin, 10 wt % of an organic pigment and 70 wt % of a solvent, such as diethylene glycol butyl ether derivative.

After the ink droplets are applied to the pixel portions 13, the substrate is left standing for 3 hours in a natural atmosphere to set the ink layer, is then heated (pre-baked) on a hot plate at 80° C. for 40 minutes, for example, and is finally heated (post-baked) inside an oven at 200° C. for 30 minutes to cure the ink layer and to obtain the color filter layer. During this drying process, the solvent evaporates due to heating, and decreases the volume of the ink in the pixel portions 13 and finally, only the solid content of ink remains and is converted to a film (see FIG. 4(c)). This process is repeated for the other colors to respectively form the pixel portions 13 of R, G and B (see FIG. 4(d)).

Next, transparent acrylic resin paint is spin-coated to the color filter substrate so produced and a protective layer 6 (overcoat layer) having a flat surface is obtained (see FIG. 4(e)). Further, an electrode layer 7 made of ITO is formed on the protective layer in a desired pattern to obtain a color filter. Incidentally, when a TFT (Thin Film Transistor), etc. is used to drive a liquid crystal, this patterning is not necessary. The resulting color filter passes durability tests including a thermal cycle durability test, a UV irradiation test, a humidification test, and so forth. It has thus been confirmed that the color filter can be sufficiently used as an element substrate of a liquid crystal display device.

In this exemplary embodiment, the bank 14 covers the shading layer 3 at the end portions, and the protective layer 6 does not come into contact with the shading layer 3. Therefore, even when the shading layer 3 formed of the metal material and the bank 14 formed of the synthetic resin have the difference of wettability to the protective layer 6, the protective layer 6 comes into contact with the bank 14 having low wettability at the end portions of the panel and is not partially pulled and so forth. It is thus possible to reduce or avoid the sharp change of the protective layer 6 and to eventually mitigate deformation of the electrode 7 along the surface of the protective layer 6 and to reduce the occurrence of disconnection.

Next, examples of electronic appliances equipped with a color filter as the electro-optical apparatus described above are explained below.

FIG. 5(a) is a perspective view showing an example of a cellular telephone unit. In FIG. 5(a), reference numeral 1000 denotes a cellular telephone main body, and reference numeral 1001 denotes a display unit using the color filter described above.

FIG. 5(b) is a perspective view showing an example of a wrist timepiece type electronic appliance. In FIG. 5(b), reference numeral 1100 denotes a timepiece main body, and reference numeral 1101 denotes a display unit using the color filter described above.

FIG. 5(c) is a perspective view showing an example of a portable information processing apparatus, such as a word processor and a personal computer, for example. In FIG. 5(c), reference numeral 1200 denotes an information processing apparatus, and reference numeral 1202 denotes an input unit, such as a keyboard, for example. Reference numeral 1204 denotes an information processing apparatus main body, and reference numeral 1206 denotes a display unit using the color filter described above.

Since the electronic appliances shown in FIGS. 5(a) to 5(c) are equipped with the color filter according to this exemplary embodiment, the defect, such as disconnection, can be reduced or suppressed, and high quality electronic appliances can be provided.

The technical range of the invention is not limited to the exemplary embodiment provided above, and can be changed or modified in various ways without departing from the scope of the invention.

The electro-optical apparatus according to the invention is not limited to the color filter for the liquid crystal display device, for example, and can be applied to MLA (Micro-Lens Array) and EL (Electro-Luminescence) display devices, for example. The EL display device has a construction in which a cathode and an anode sandwich a thin film containing fluorescent inorganic and organic compounds between them. Electrons and positive holes are injected to the thin film and are allowed to undergo re-combination to create excitons. The EL display device utilizes emission of light (fluorescence•phosphorescence) when the excitons are inactivated. Among the fluorescent materials used for such an EL display device, materials exhibiting red, green and blue colors, that is, the materials to form the light emitting layer and the materials to form the positive hole injection/electron transportation layers, are ink, and each material is patterned as a functional layer on the device substrate of the TFT (Thin Film Transistor), the TFD (Thin Film Diode), and the like. In this way, the invention can produce a self light-emitting full color EL device. The range of the electro-optical apparatus according to the invention also includes such an EL device.

As explained above, the invention provides the effect that, as the sharp change of the protective layer can be reduced or avoided, the occurrence of disconnection of the electrode can be reduced. The invention provides also the effect that high quality electronic appliances and devices can be obtained by reducing or suppressing defects, such as disconnection.

What is claimed is:

1. A device, comprising:
    a shading layer;
    a partition layer, having an end portion, formed on said shading layer;
    an electrode layer formed above said partition layer;
    a protective layer formed between the electrode layer and the partition layer to cover the shading layer;
    a functional layer formed between said partition layer and disposed below the protective layer;
    the end portion of the partition layer covering said shading layer and separating said protective layer from said shading layer under a non-contact state.

2. The device as defined in claim 1, said functional layer being an organic EL light emitting layer.

3. The device as defined in claim 1, said functional layer being a micro-lens array.

* * * * *